Patented Nov. 15, 1927.

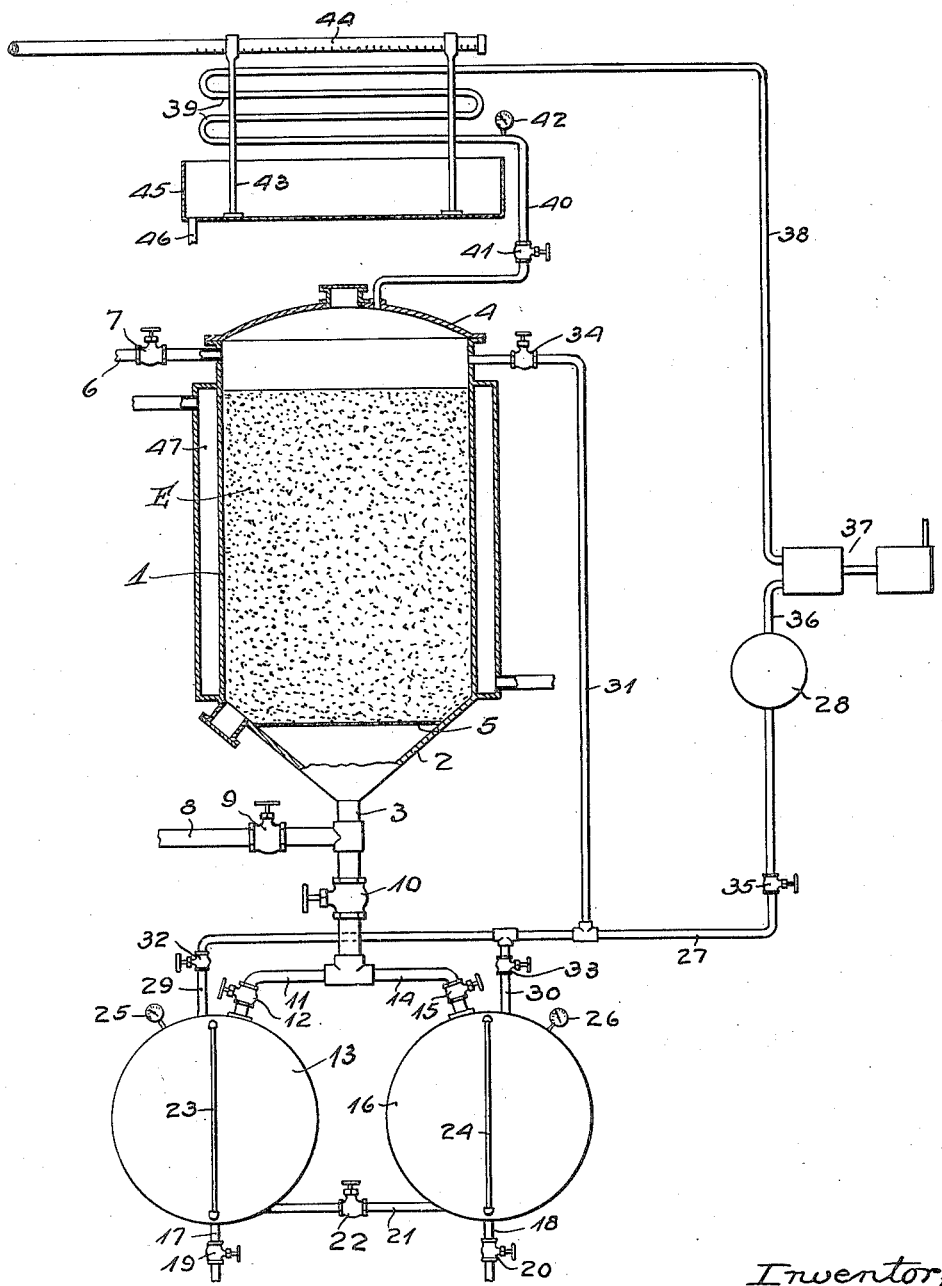

1,649,193

UNITED STATES PATENT OFFICE.

RUDOLPH R. ROSENBAUM, OF CHICAGO, ILLINOIS.

FULLER'S EARTH-TREATING PROCESS.

Application filed January 29, 1927. Serial No. 164,444.

My invention relates to the treatment of adsorbent materials, such as fuller's earth and it covers particularly a process for extracting oil from and for reclaiming and revivifying used fuller's earth by means of sulphur dioxide in the liquid form. The invention is useful and desirable in filtration systems for reconditioning and revivifying fuller's earth which has been used for filtering hydrocarbons, animal and vegetable oils, fats and waxes, and the process can be performed without removing the fuller's earth from the filter.

Fuller's earth, particularly when used for the filtration and decolorizing of the above mentioned substances becomes easily exhausted as the coloring matters and impurities accumulate in and fill up the pores, and after a few operations the earth becomes useless. Heretofore, the spent fuller's earth was usually subjected to the burning process which involves the treatment with naphtha to extract the oil, then steaming to remove the naphtha, then drying to remove the moisture, and then burning to restore the porosity as much as possible. This is laborious, expensive, and unsafe, it being necessary to transport the fuller's earth from the filter to a considerable distance for the burning operation, and then transportation of the burned earth back to the filter. Furthermore, the burning process cannot entirely remove the coloring matter and impurities from the pores, and after several burning treatments the earth must be discarded as useless.

Liquid sulphur dioxide is a ready solvent of all vegetable oils, animal oils and unsaturated hydrocarbons. My process can, therefore, be used with great efficiency and saving for treating fuller's earth which has been used in the filtration of substances such as hydrocarbons, animal oils, vegetable oils, fats or waxes. The liquid dioxide will dissolve from petroleum any of the hydrocarbons with the exception of those of the paraffin series. Fuller's earth has greater attraction for the unsaturated or soluble hydrocarbons than it has for the paraffin hydrocarbons, and it is these soluble hydrocarbons which mostly carry the coloring matters of which the oil is to be purged. The coloring matters will, therefore, pass out with the hydrocarbon in solution with the sulphur dioxide.

The fuller's earth treated may be kept in the filter where it was used for filtration purposes. The filter is closed, except for an outlet to a receiving tank or tanks and then liquid sulphur dioxide is charged into the top of the filter. The dioxide should be kept at a proper pressure dependent upon the temperature, so that it will maintain its liquid state, and the liquid dioxide will permeate and flow rapidly through the fuller's earth to flush out both the soluble and insoluble hydrocarbons and to dissolve the soluble hydrocarbons, the mixture flowing into the receiving tank. The earth may be subjected to several washings which are collected in the receiving tank, and in this tank the insoluble hydrocarbons will float to the top of the liquid so that separation can be readily accomplished. The liquid sulphur dioxide with the dissolved hydrocarbon and the coloring matter and impurities may be drawn off from the bottom of the receiving tank to another tank, leaving the insoluble hydrocarbons in the first tank. After such separation the pressure of the dioxide is released in the tanks and in the filter, so that the dioxide will return to its gaseous state, in which condition it will readily flow from the tank and filter or can be positively withdrawn. In the filter the fuller's earth will be cleaned and thoroughly revivified, and in the tank all the sulphur dioxide will have left, leaving the insoluble hydrocarbons in the one tank and in the other tank the soluble hydrocarbons with their coloring matter contents. The soluble hydrocarbons can be withdrawn from the tank and subjected to any well known process for removing the coloring matter and impurities therefrom. Thus, besides thoroughly extracting the oil from and revivifying the fuller's earth in the filter, my process separates the undesirable insoluble or paraffin contents from the oil.

In addition to the further purging of the fuller's earth of oil, it has a beneficial direct chemical action on the earth as it dissolves some of the elements, such as magnesia, aluminum, and others, and leaves the silica content of the earth in a more amorphous or porous state, thereby enhancing the adsorption characteristics of the earth which is so important for the proper decolorization action of the earth.

New or unused fuller's earth can be very much improved by treating it with sulphur dioxide either in a gaseous or liquid form. If the decolorizing power of a fresh earth is expressed as (1), then the decolorizing power of the earth treated with sulphur dioxide may be increased to 1½ or as high even as 2½, depending on the source the earth came from.

Sulphur dioxide can also be used where the fuller's earth is wet. The exhausted earth can therefore remain in the filter and be given a steam treatment for removing the greater part of the oil therefrom, and then the wet earth will be given the sulphur dioxide treatment, the dioxide uniting with the moisture to form sulphurous acid which will dissolve the oil remaining in the earth and revivify the earth. If sulphurous acid were used directly it would have the same result. Thus the earth can be purged and revivified without the cumbersome procedure of removing it from the filter and carting it to some distant place for the burning operation which was necessary in connection with revivifying processes as heretofore practiced.

On the drawing I diagrammatically represent apparatus and arrangement for practicing my improved treatment and process. The filter 1 is shown as being conical at the bottom 2 leading to the outlet pipe 3, and it has the removable cover 4. At the bottom is placed a perforated floor 5 on which rests the fuller's earth E which has been used for filtration purposes and which is to be cleaned and reconditioned. At the upper end of the filter is the inlet pipe 6 for the oil to be filtered, the inlet being controlled by a valve 7. From the outlet pipe 3 extends the pipe 8 controlled by valve 9 for the outflow of filtered oil.

A valve 10 controls the flow through the outlet pipe 3 and this pipe branches, the branch 11 controlled by a valve 12 extending to a tank 13, while the branch 14 controlled by the valve 15 extends to the tank 16, the tanks being below the filter structure. At their bottoms the tanks have the discharge outlets 17 and 18, respectively, controlled by valves 19 and 20, respectively, and at their lower ends the tanks are cross connected by a pipe 21 in which is interposed the valve 22. Stand glasses 23 and 24 indicate the fluid level in the respective tanks, while gauges 25 and 26 will indicate the pressure.

A pipe 27 extends from the gas tank 28 for sulphur dioxide gas and connects through branch pipes 29 and 30 with the tops of tanks 13 and 16, and which is connected by branch pipe 31 with the upper end of the filter 1. The branch pipes 29 and 30 contain controlling valves 32 and 33, while the branch pipe 31 contains the controlling valve 34, the main pipe 27 including the controlling valve 35.

The tank 28 connects through pipe 36 with the intake end of a compressor 37, whose pressure outlet connects with the pipe 38 extending to one end of a cooling coil 39, whose other end is connected by pipe 40 with the top of the filter under control of a valve 41, a gauge 42 indicating the pressure on the sulphur dioxide liquid.

The cooling coil 39 may be supported on frame 43 with supports at the upper end and above the coil, a cold water sprinkling pipe 44. A pan or tank 45 receives the sprinkling water below the coil, the pipe 46 conducting excess water away from the tank. The compressor subjects the sulphur dioxide gas to such pressure, and the coil 39 is kept at such a temperature, that the gas will be converted to liquid form, in which form it can be introduced into the filter by the opening of the valve 41, which valve remains closed until the sulphur dioxide has been changed into its liquid state. If necessary, the filter body may be surrounded by a cooling jacket 47 for the circulation of cooling water or brine for keeping the temperature in the filter sufficiently low to prevent gasification of the sulphur dioxide liquid while it is passing through the fuller's earth.

Before opening the valve 41 for the inflow of liquid sulphur dioxide, the valves 7, 8 and 34 are closed, and only the outlet valve 10 is opened, and either of the valves 12 or 15, or both, are opened for flow into the tanks 13 and 16. The valves 32 and 33 are also closed. Where the oil to be cleaned out of the fuller's earth is a hydrocarbon which is partly soluble and partly insoluble, only one of the tanks would be opened to flow from the filter, say the tank 13, and in this case the valve 12 would be opened and the valve 15 closed, and, likewise, valve 22 would be closed. The liquid sulphur dioxide charged into the filter under pressure will rapidly permeate and flow through the fuller's earth E and will flush out both the soluble and insoluble hydrocarbons and dissolve the soluble hydrocarbon, the liquid flowing down through the outlet pipe 3 and the branch pipe 11 into the tank 13. In the tank 13 the insoluble hydrocarbon, which is lighter than the liquid sulphur dioxide, will rise and float on the top of the liquid and its level can be observed through the stand glass 23. When the valve 12 was opened the tank 13 became subjected to the pressure of the sulphur dioxide, and separation of the insoluble hydrocarbons can now readily be effected by opening the valve 22 so that the sulphur dioxide with the dissolved hydrocarbons and the coloring matter may flow into the tank 16. As the tank 16 is not subjected to the sulphur dioxide pressure, the pressure in the tank 13 will force the flow of the dioxide and dissolved hydrocarbons into the tank 16 and as soon as all the liquid has passed into the tank 16 the valve 22 will be closed so that only the insoluble or paraffin contents will remain in the tank 13.

After such separation of the hydrocarbons in the tanks, the valve 41 is closed and the valves 35, 34, 33 and 32 are opened so that the filter and tanks are connected with the gas tank 28 into which the pressure in the filter and tanks 13 and 16 may relieve itself. After such relieving of the pressure, the sulphur dioxide will change from liquid back into a gaseous state and will flow back into the tank 28 to be subsequently redrawn therefrom into the compressor and compressed for a further revivifying operation. The dioxide in gaseous form flows back to the tank 28 in perfectly clean and pure condition and in the filter the revivified and purged fuller's earth will be dry and clear of any sulphur dioxide, and in the tanks 13 and 16 all the dioxide will have left. From the tank 13 the insoluble hydrocarbons can be withdrawn through outlet 17, and from the tank 16 the soluble oil with its coloring matter contents may be withdrawn and cleaned in any well known manner of such coloring matter.

It is evident that other materials having adsorption properties may be cleaned and revivified by my improved process.

I claim:—

1. The process of revivifying used fuller's earth which consists in washing it with liquid sulphur dioxide.

2. The process of increasing the adsorption properties of fuller's earth which consists in washing it with liquid sulphur dioxide.

3. The process of increasing the adsorption properties of fuller's earth which consists in leaching it with liquid sulphur dioxide.

4. The process of revivifying used fuller's earth which consists in passing liquid sulphur dioxide therethrough and then removing the dioxide by converting it into its gaseous state.

5. The extracting of oil from and revivifying of fuller's earth by passing liquid sulphur dioxide therethrough.

6. The process of extracting oil from and reconditioning fuller's earth which consists in forcing liquid sulphur dioxide therethrough under pressure to flush and dissolve out the oil, and then relieving the pressure to permit the dioxide to return to gaseous form and to leave the fuller's earth.

7. The process of extracting hydrocarbons from fuller's earth and revivifying the earth which consists in flushing and dissolving out the hydrocarbons by means of liquid sulphur dioxide, and separating the insoluble and soluble hydrocarbons, and then converting the liquid sulphur dioxide to gaseous form and removing the gas.

8. The process of cleaning and revivifying fuller's earth which has been used for filtering hydrocarbons, which consists in charging liquid sulphur dioxide into the filter to flow through and flush out and dissolve the hydrocarbons remaining in the earth, collecting the resulting liquid, separating the insoluble from the soluble hydrocarbons, and then changing the sulphur dioxide into gaseous form to thereby remove it from the fuller's earth and from the extracted hydrocarbons.

In witness whereof I hereunto subscribe my name this 26th day of January, 1927.

RUDOLPH R. ROSENBAUM.